United States Patent
Lee et al.

(10) Patent No.: US 10,215,843 B2
(45) Date of Patent: Feb. 26, 2019

(54) SPATIAL INTERPOLATION METHOD AND APPARATUS FOR LINEAR PHASED ARRAY ANTENNA

(71) Applicants: MANDO CORPORATION, Pyeongtaek-si, Gyeonggi-do (KR); Seoul National University R&DB Foundation, Seoul (KR)

(72) Inventors: Jaeeun Lee, Seoul (KR); Seong Hee Jeong, Yongin-si (KR); Seongwook Lee, Seoul (KR); Seokhyun Kang, Seoul (KR); Heonkyo Shim, Seoul (KR); SeongCheol Kim, Seoul (KR)

(73) Assignees: MANDO CORPORATION, Pyeongtaek-si, Gyeonggi-do (KR); Seoul National University R&DB Foundation, Seoul (KR)

( * ) Notice: Subject to any disclaimer, the term of this patent is extended or adjusted under 35 U.S.C. 154(b) by 378 days.

(21) Appl. No.: 15/253,870

(22) Filed: Sep. 1, 2016

(65) Prior Publication Data
US 2017/0059694 A1    Mar. 2, 2017

(30) Foreign Application Priority Data
Sep. 1, 2015 (KR) ........................ 10-2015-0123802

(51) Int. Cl.
*G01S 7/40* (2006.01)
*G01S 13/06* (2006.01)
*H01Q 21/08* (2006.01)

(52) U.S. Cl.
CPC ............ *G01S 7/4021* (2013.01); *G01S 13/06* (2013.01); *H01Q 21/08* (2013.01)

(58) Field of Classification Search
CPC ... G01S 7/40; G01S 7/4021; G01S 2007/4039
See application file for complete search history.

(56) References Cited

U.S. PATENT DOCUMENTS

| 5,657,023 A * | 8/1997 | Lewis | H01Q 3/2652 342/174 |
| 7,248,209 B2 * | 7/2007 | Shima | G01S 7/4008 342/173 |

(Continued)

FOREIGN PATENT DOCUMENTS

KR    10-2011-0080218 A    7/2011

*Primary Examiner* — Peter M Bythrow
(74) *Attorney, Agent, or Firm* — Hauptman Ham, LLP

(57) ABSTRACT

According to an embodiment of the present disclosure, a spatial interpolation method for a linear phased array antenna relates to a spatial interpolation method for a linear phased array antenna including a plurality of transmission antenna elements and a plurality of reception antenna elements and includes Step 1 in which the plurality of reception antenna elements receive a reflected wave reflected from a target, Step 2 in which an incidence angle of the reflected wave incident on the plurality of reception antenna elements is estimated using an angle estimation algorithm, Step 3 in which a bad-conditioned antenna element is selected from among the plurality of reception antenna elements, and Step 4 in which a received signal of the bad-conditioned antenna element is compensated for and the incidence angle of the reflected wave incident on the plurality of reception antenna elements is re-estimated using an angle estimation algorithm.

16 Claims, 4 Drawing Sheets

(56) References Cited

U.S. PATENT DOCUMENTS

| | | | | |
|---|---|---|---|---|
| 7,498,971 B2* | 3/2009 | Takagi | ............... | G01S 7/4004 |
| | | | | 342/70 |
| 7,522,096 B2* | 4/2009 | Backes | ............. | G01S 7/4017 |
| | | | | 342/165 |
| 8,154,452 B2* | 4/2012 | Webb | ................. | H01Q 3/267 |
| | | | | 342/174 |
| 2003/0142012 A1* | 7/2003 | Hirabe | ............... | H01Q 3/267 |
| | | | | 342/173 |
| 2005/0275585 A1* | 12/2005 | Shima | ............... | G01S 7/4008 |
| | | | | 342/174 |
| 2009/0109085 A1* | 4/2009 | Needham | ........... | G01S 7/4017 |
| | | | | 342/174 |
| 2013/0113652 A1* | 5/2013 | Smits | ................ | G01S 7/4004 |
| | | | | 342/174 |
| 2014/0340254 A1* | 11/2014 | Hesse | ................ | G01S 7/4008 |
| | | | | 342/173 |
| 2015/0177303 A1* | 6/2015 | Ebling | ............... | G01R 29/10 |
| | | | | 342/27 |

* cited by examiner

SPATIAL INTERPOLATION METHOD AND APPARATUS FOR LINEAR PHASED ARRAY ANTENNA

CROSS-REFERENCE TO RELATED APPLICATION

This application claims priority to and the benefit of Korean Patent Application No. 10-2015-0123802, filed on Sep. 1, 2015, the disclosure of which is incorporated herein by reference in its entirety.

BACKGROUND

1. Field of the Invention

The present disclosure relates to a spatial interpolation method and apparatus for an antenna, and more particularly, to a spatial interpolation method for a linear phased array antenna.

2. Discussion of Related Art

During the past several decades, numerous studies have been carried out on detecting a target with a radar system. Knowing information on a distance, speed, and angle of a target is essential for determining an accurate position of the target. A method of mechanically rotating an antenna has been conventionally used for identifying a direction of arrival (hereinafter, DOA) of a signal reflected from a target. However, with a phased array antenna, a DOA of an incident signal may be estimated by electrically steering a beam of the phased array antenna.

In the case of a phased array antenna, a concept and technology for processing numerous array signals have been suggested for simultaneously estimating the DOA of a plurality of incident signals. Specifically, there has been an attempt to identify an accurate DOA with a uniform linear phased array antenna using a high-resolution angle estimation algorithm. However, since high-resolution angle estimations algorithm that have been suggested so far are very sensitive to a signal-to-noise ratio (hereinafter, SNR) of a received signal, the received signal needs to be calibrated to estimate an accurate DOA.

RELATED ART DOCUMENT

Patent Document (Patent Document 1) Korean Unexamined Patent Application Publication No. 10-2011-0080218

SUMMARY OF THE INVENTION

To solve the problem mentioned above, a spatial interpolation method and apparatus for a linear phased array antenna according to an embodiment of the present disclosure has the following aspects.

It is an aspect of the present disclosure to provide a spatial interpolation method and apparatus for a linear phased array antenna capable of determining an accurate position of a target by guaranteeing an estimation of an accurate DOA with a linear phased array antenna.

Aspects of the present disclosure are not limited to that mentioned above, and other unmentioned aspects should be clearly understood by those of ordinary skill in the art from the description below.

According to an embodiment of the present disclosure, a spatial interpolation method for a linear phased array antenna relates to a spatial interpolation method for a linear phased array antenna including a plurality of transmission antenna elements and a plurality of reception antenna elements and includes Step 1 in which the plurality of reception antenna elements receive a reflected wave reflected from a target, Step 2 in which an incidence angle of the reflected wave incident on the plurality of reception antenna elements is estimated using an angle estimation algorithm, Step 3 in which a bad-conditioned antenna element is selected from among the plurality of reception antenna elements, and Step 4 in which a received signal of the bad-conditioned antenna element is compensated for and the incidence angle of the reflected wave incident on the plurality of reception antenna elements is re-estimated using an angle estimation algorithm.

Preferably, Step 3 includes Step 3-1 in which a received signal power of the reflected wave received by each of the plurality of reception antenna elements is calculated, Step 3-2 in which the received signal power of the reflected wave received by each of the plurality of reception antenna elements is compared with a threshold value, and Step 3-3 in which the bad-conditioned antenna element is selected from among the plurality of reception antenna elements based on a result of the comparison in Step 3-2.

Preferably, Step 4 includes Step 4-1 in which a received signal of the bad-conditioned antenna element is compensated for based on a received signal of another reception antenna element and Step 4-2 in which the incidence angle of the reflected wave incident on the plurality of reception antenna elements is re-estimated using the angle estimation algorithm by reflecting the compensated received signal of the bad-conditioned antenna element.

Preferably, the angle estimation algorithm is a multiple signal classification (MUSIC) algorithm or an estimation of parameters via rotational invariance technique (ESPRIT).

According to an embodiment of the present disclosure, a spatial interpolation apparatus for a linear phased array antenna includes a plurality of reception antenna elements that receive a reflected wave reflected from a target, an incidence angle estimator that estimates an incidence angle of the reflected wave incident on the plurality of reception antenna elements, a detector that selects a bad-conditioned antenna element from among the plurality of reception antenna elements based on the incidence angle of the reflected wave, and a compensator that compensates for a received signal of the bad-conditioned antenna element based on a result of the selection by the detector, wherein the incidence angle estimator re-estimates the incidence angle of the reflected wave incident on the plurality of reception antenna elements based on the received signal of the bad-conditioned antenna element compensated for by the compensator.

Preferably, the detector selects the bad-conditioned antenna element based on a received signal power of the reflected wave received by each of the plurality of reception antenna elements.

Preferably, the detector includes a power calculator that calculates the received signal power of the reflected wave received by each of the plurality of reception antenna elements, a comparator that compares the calculated received signal power with a threshold value, and a determinator that determines the bad-conditioned antenna element among the plurality of reception antenna elements based on a result of the comparison by the comparator.

Preferably, the compensator compensates for the received signal of the bad-conditioned antenna element based on a received signal of another reception antenna element.

Preferably, the incidence angle estimator estimates and re-estimates the incidence angle of the reflected wave incident on the plurality of reception antenna elements using an angle estimation algorithm.

Preferably, the angle estimation algorithm is a MUSIC algorithm or an ESPRIT.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
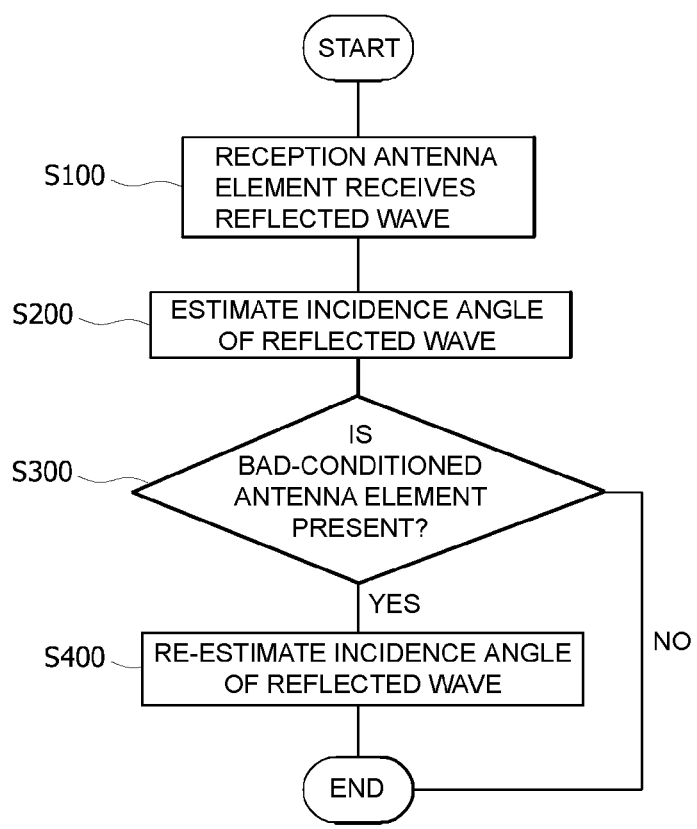
FIG. 1 is a flowchart illustrating a spatial interpolation method for a linear phased array antenna according to an embodiment of the present disclosure in time series.

An exemplary embodiment of the present disclosure will be described in detail with reference to the accompanying drawings. The same reference numerals will be given to the same or similar elements regardless of the drawings, and overlapping descriptions will be omitted.

In addition, when a detailed description of a known related art is deemed to blur the gist of the present disclosure in describing the present disclosure, the detailed description thereof will be omitted. Also, the accompanying drawings are merely for assisting in an easy understanding of the spirit of the present disclosure, and the spirit of the present disclosure are not to be construed as being limited by the accompanying drawings.

Figure 2:
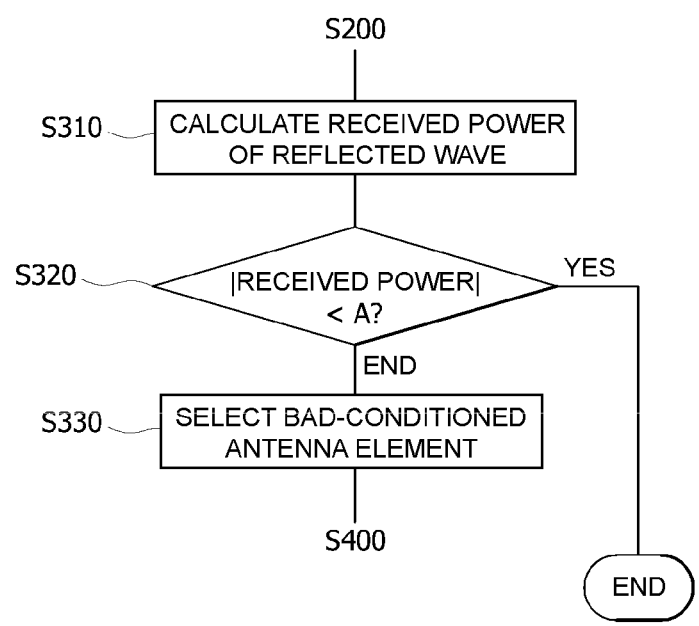
FIGS. 2 and 3 are flowcharts in which some steps of the method of FIG. 1 are further subdivided and specified.
Figure 3:
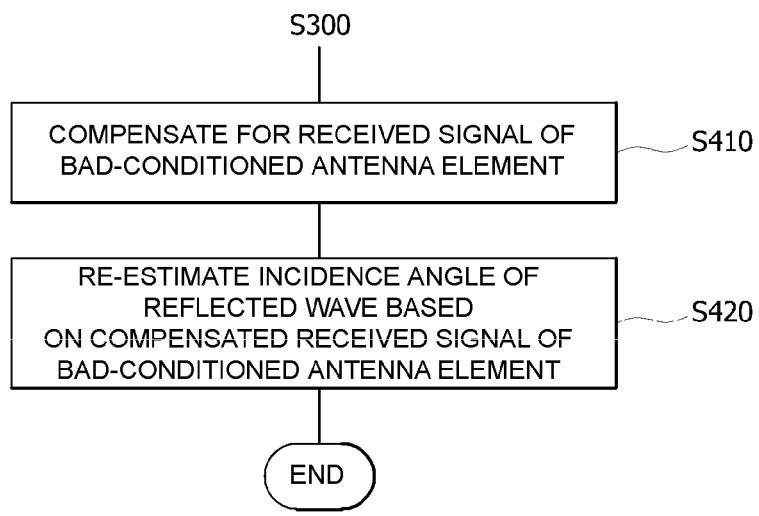

Hereinafter, a spatial interpolation method for a linear phased array antenna according to an embodiment will be described with reference to FIGS. 1 to 3. FIG. 1 is a flowchart illustrating a spatial interpolation method for a linear phased array antenna according to an embodiment of the present disclosure in time series, and FIGS. 2 and 3 are flowcharts in which some steps of the method of FIG. 1 are further subdivided and specified.

According to an embodiment of the present disclosure, a spatial interpolation method for a linear phased array antenna relates to a spatial interpolation method for a linear phased array antenna 100 including a plurality of transmission antenna elements 110 and a plurality of reception antenna elements 120 and includes, as illustrated in FIG. 1, Step 1 (S100) in which the plurality of reception antenna elements 120 receive a reflected wave, Step 2 (S200) in which an incidence angle of the reflected wave is estimated, Step 3 (S300) in which a bad-conditioned antenna element is selected, and Step 4 (S400) in which the incidence angle of the reflected wave is re-estimated.

Specifically, in Step 1 (S100), the plurality of transmission antenna elements 110 transmit a signal to a target 10, the transmitted signal is reflected by the target 10, and the reception antenna elements 120 receive a reflected wave reflected from the target 10. Meanwhile, for detailed descriptions of Step 1 (S100) to Step 4 (S400), a model of a received signal of a phased array antenna will be described first below.

It is assumed that L plane waves are incident on N reception antenna elements 120 linearly spaced apart at equal intervals d from L directions $\theta_1, \theta_2, \ldots, \theta_L$ with a known carrier frequency $f_c$. $\theta_i (i=1, 2, \ldots, L)$ is defined from a front axis facing an array antenna. In addition, narrowband long-distance sources are assumed to be present. Next, a received signal vector of the array antenna at a time k is expressed as Equation 1 below.

$$x(k) = As(k) + n(k) = [x_1(k), x_2(k), \ldots, x_N(k)]^T \quad \text{[Equation 1]}$$

In Equation 1 above, $(\cdot)^T$ is a transpose operator, and $A = [a(\theta_1), a(\theta_2), \ldots a(\theta_L)]$ is a steering matrix formed of a steering vector, $a(\theta_i)(i=1, 2, \ldots, L)$, shown in Equation 2 below.

$$a(\theta_i) = \left[1, e^{j\frac{2\pi}{\lambda}d\sin\theta_i}, \ldots, e^{j\frac{2\pi(N-1)}{\lambda}d\sin\theta_i}\right]^T \quad \text{[Equation 2]}$$

$\lambda$ is a wavelength corresponding to the carrier frequency $f_c$. Meanwhile, $s(k) = [s_1(k), s_2(k), \ldots, s_N(k)]^T$ is an incident signal vector, and here, $s_i(K)$ $(i=1, 2, \ldots, L)$ is a complex amplitude of the of an incident signal from an $i^{th}$ source at the time k. It is assumed that the amplitudes are zero-mean complex Gaussian and are independent for each amplitude sample. It is assumed that n(k) is a noise vector formed of $[n_1(k), n_2(k), \ldots, n_N(k)]^T$, and the noise vector is also zero-mean complex Gaussian and is independent for each sample. A correlation matrix is provided as $\sigma_i^2 I_N (i=1, 2, \ldots, N)$, and here, $I_N$ is an N*N identity matrix. In addition, it is assumed that samples from an incident signal vector and a noise vector are independent of each other.

After Step 1 (S100), Step 2 (S200), in which an incidence angle of a plurality of received reflected waves is estimated, is performed. An angle estimation algorithm is used for the estimation of the incidence angle. The angle estimation algorithm includes a multiple signal classification (MUSIC) algorithm, an estimation of parameters via rotational invariance technique (ESPRIT), or the like, and an embodiment in which an incidence angle of a reflected wave is estimated using the MUSIC algorithm will be mainly described hereinafter.

To use the MUSIC algorithm, first, a correlation matrix of the received signal vector in Equation 1 above should be operated. The correlation matrix is defined by Equation 3 below.

$$\begin{aligned} R_{xx} &= E[x(k)x(k)^H] \\ &= AE[s(k)s(k)^H]A^H + \Lambda_N \\ &= AR_{ss}A^H + \Lambda_N \end{aligned} \quad \text{[Equation 3]}$$

In Equation 3, $E[\cdot]$ is an ensemble average of a random process, and $(\cdot)^H$ is a complex conjugate transpose operator.

A rank of $R_{XX}$ follows a rank of $AR_{SS}A_H$, and the rank is L. Eigenvalues of $R_{XX}$ may be arranged in a descending order expressed in Equation 4 below.

$$\lambda_1 \geq \lambda_2 \geq \ldots \geq \lambda_L \geq \lambda_{L+1} \geq \ldots \geq \lambda_N \quad \text{[Equation 4]}$$

First L eigenvalues are related to subspaces of signals, and the remaining eigenvalues are related to a subspace of noise. When a normalizes eigenvector of each of the eigen values is given as $v_i(i=1, 2, \ldots, N)$, a pseudospectrum of the MUSIC algorithm, $P(\theta)$, is defined as Equation 5 below.

$$P(\theta) = \frac{a(\theta)^H a(\theta)}{a(\theta)^H \left( \sum_{i=L+1}^{N} v_i v_i^H \right) a(\theta)} \quad \text{[Equation 5]}$$

Here, $$\sum_{i=L+1}^{N} v_i v_i^H$$

in the denominator forms a subspace of noise and is orthogonal to an incident signal. An estimated DOA of the incident signal is determined by a value of θ that makes the denominator of P(θ) close to zero. However, it is actually impossible to know exact statistics for signals and noise, and thus it is difficult to operate the ensemble average in Equation 3. In this case, when a process is assumed to be an ergodic method, a time-averaged correlation matrix is calculated by finite K measurements while noise is present and is defined as below.

$$\overline{R}_{xx} = \frac{1}{K} \sum_{k=1}^{K} x(k) x(k)^H \quad \text{[Equation 6]}$$

Another significant issue when applying the MUSIC algorithm is how the number of incident signals is determined. However, since it is impossible to precisely know the number of incident plane waves, the number of incident plane waves is estimated by comparing sizes of eigenvalues of a correlation matrix, or a set value which is empirically set is used as the number of incident plane waves. Here, the set value may vary according to a size of a field of view (FOV), which is a range in which a DOA is desired to be known.

The assumptions related to Equation 6 described above are applied to Step 2 (S200), and the MUSIC algorithm is applied to initially received signals incident on the plurality of reception antenna elements 120.

Meanwhile, as described above, performance of the conventional MUSIC algorithm is sensitive to an SNR of a received signal of an array. The MUSIC algorithm may adequately operate when SNRs of received signals of all elements are high and almost equal to each other. When SNRs of received signals are not uniform, there is a problem in that decomposition performance of the MUSIC algorithm is degraded. Consequently, spatial interpolation is required to improve resolution. Consequently, in the spatial interpolation method for a linear phased array antenna according to an embodiment of the present disclosure, Step 3 (S300), in which a bad-conditioned antenna element is selected from among the plurality of reception antenna elements 120, and Step 4 (S400), in which a received signal of the bad-conditioned antenna element is compensated for and the incidence angle of the reflected wave is re-estimated using an angle estimation algorithm, are performed after Step 2 (S200). Hereinafter, Step 3 (S300) and Step 4 (S400) will be described in detail with reference to FIGS. 2 and 3.

As illustrated in FIG. 2, Step 3 (S300) includes Step 3-1 (S310) in which a received signal power of a reflected wave is calculated, Step 3-2 (S320) in which the received signal power of the reflected wave is compared with a threshold value, and Step 3-3 (S330) in which a bad-conditioned antenna element is selected.

After Step 2 (S200), an SNR of a received signal, which is the reflected wave, is measured first. By taking into consideration the fact that it is difficult to separate a desired signal and noise from the received signal, an SNR value is substituted with the received signal power in Step 3-1 (S310).

Since it is assumed that incident signals come from uncorrelated sources that receive an equal amount of power, the received signal power is mainly affected by a noise power level. Accordingly the SNR value is inversely proportional to the received signal power in this case. For example, when a predetermined antenna element has a high noise floor, a measured received signal power is high while a measured SNR is low. For this reason, the received signal power is used as a substitution parameter that is substituted for the SNR value. When an averaged received signal power of an $i^{th}$ (i=1, 2, . . . , N) antenna element with respect to K time samples is expressed as $P_i$, a received signal power vector may be defined as Equation 7 below.

$$P = [P_1, P_2, \ldots, P_N] \quad \text{[Equation 7]}$$
$$= \left[ \frac{1}{K} \sum_{k=1}^{K} |x_1(k)|^2, \frac{1}{K} \sum_{k=1}^{K} |x_2(k)|^2, \ldots, \frac{1}{K} \sum_{k=1}^{K} |x_N(k)|^2 \right]$$

When there is almost no difference between $P_i$'s, an algorithm may estimate two separate DOAs, i.e., $\hat{\theta}_1$ and $\hat{\theta}_2$, with respect to two adjacent incident signals. When there is a difference between $P_i$'s, two signals are integrated into a single signal and the algorithm only estimates one DOA, $\hat{\theta}_0$.

After Step 3-1 (S310), Step 3-2 (S320), in which the received signal power of the reflected wave received by each of the plurality of reception antenna elements 120 is compared with the threshold value with respect to only one estimated DOA, and Step 3-3 (S330), in which a bad-conditioned antenna element is selected from among the plurality of reception antenna elements 120 based on a result of the comparison in Step 3-2 (S320), are performed.

The threshold value in Step 3-2 (S320) may be a predetermined value or may be determined by a ratio with a maximum value. Hereinafter, an example in which Step 3-2 (S320) and Step 3-3 (S330) are performed using an average of the received signal powers of the reflected waves respectively received by the plurality of reception antenna elements 120 will be described.

First, $P_i$'s of all elements are averaged with respect to $\hat{\theta}_0$ which is one estimated DOA by Equation 8 below.

$$P_{avg} = \frac{1}{N} \sum_{i=1}^{N} P_i \quad \text{[Equation 8]}$$

Then, a bad-conditioned antenna element is selected from among the plurality of reception antenna elements 120. The bad-conditioned antenna element may be selected by selecting an element that satisfies a condition shown in Equation 9 below.

$$i^* = \arg_{i \in \{1,2,\ldots,N\}} (P_i - P_{avg} > P_{thr}) \quad \text{[Equation 9]}$$

In Equation 9 above, i* is defined as a bad-conditioned antenna element, and $P_{thr}$ refers to a threshold power value that should be set. Meanwhile, $P_{thr}$ may be a randomly set value or ratio, or may further be set using a ratio with respect to a maximum power value.

Meanwhile, although the embodiment in which a bad-conditioned antenna element is selected using Equation 8 and Equation 9 has been described above, the bad-conditioned antenna element may also be selected using other various statistical methods such as a median and a mean maximum value or the like.

In addition, a received signal of a time domain may be converted into a received signal of a frequency domain using fast Fourier transform (FFT), and the bad-conditioned antenna element may also be selected by comparing peak values of the received signal powers.

Specifically, a frequency band having the peak values of the received signal powers received by the plurality of antenna elements may be selected, and, by comparing the peak values of the received signal powers in the frequency band with each other, an antenna element that has received a received signal power having a relatively smallest peak value among the peak values may be selected as the bad-conditioned antenna element.

Unlike this, the received signal of the time domain may be converted into the received signal of the frequency domain using the FFT, a difference between floor levels of peripheral values around a peak value and the peak value of the received signal power may be compared for each of the antenna elements, and an antenna element with the smallest difference may be selected as the bad-conditioned antenna element, or a predetermined reference value may be preset and an antenna element in which the difference between the floor levels of the peripheral values and the peak value is the reference value or less may be selected as the bad-conditioned antenna element. Here, the floor level of the peripheral values may be calculated using an average of the peripheral values except the peak value.

When the bad-conditioned antenna element is selected as above, Step 4 (S400), in which the incidence angle of the reflected wave is re-estimated, is performed. As illustrated in FIG. 3, Step 4 (S400) may be divided into Step 4-1 (S410) in which a received signal of the bad-conditioned antenna element is compensated for and Step 4-2 (S420) in which the incidence angle of the reflected wave is re-estimated based on the compensated received signal of the bad-conditioned antenna element.

Specifically, Step 4-1 (S410) compensates for the received signal of the bad-conditioned antenna element based on a received signal of another reception antenna element. Hereinafter, an example in which the received signal of the bad-conditioned antenna element is compensated for based on received signals of two antenna elements adjacent to the bad-conditioned antenna element will be described.

K time-sampled received signals from an $i^{*th}$ element are expressed as below.

$$X_{i*} = [x_{i*}(1), x_{i*}(2), \ldots, x_{i*}(K)] \quad \text{[Equation 10]}$$

Here, as described with reference to Equation 1, $x_{i*}(k)$ is a received signal received by the $i^{*th}$ element at the time k. A signal vector $X_{i*}$ has a lower SNR than the remaining signal vectors. Consequently, resolution performance of the MUSIC algorithm is improved when $X_{i*}$ is modified. By using received signal vectors from an $(i*-1)^{th}$ element and an $(i*+1)^{th}$ element, $X_{i*}$ may be modified as $\hat{X}_{i*}$ as shown in Equation 11 below.

$$\hat{X}_{i*} = \frac{X_{i*-1} e^{j\frac{2\pi}{\lambda}d\sin\bar{\theta}_0} + X_{i*} + X_{i*+1} e^{-j\frac{2\pi}{\lambda}d\sin\bar{\theta}_0}}{3} \quad \text{[Equation 11]}$$

Here, $\hat{\theta}_0$ is a DOA estimated in Step 2 (S200). When two signals $s_1(k)$ and $s_2(k)$ are incident on an array from directions $\theta_1$ and $\theta_2$, $x_{i*-1}(k)$, $x_{i*}(k)$, and $x_{i*+1}(k)$ are expressed as Equation 12 below.

$$x_{i*-1}(k) = \quad \text{[Equation 12]}$$
$$s_1(k)e^{j\frac{2\pi(i*-2)}{\lambda}d\sin\bar{\theta}_1} + s_2(k)e^{j\frac{2\pi(i*-2)}{\lambda}d\sin\bar{\theta}_2} + n_{i*-1}(k)$$
$$x_{i*}(k) = s_1(k)e^{j\frac{2\pi(i*-1)}{\lambda}d\sin\bar{\theta}_1} + s_2(k)e^{j\frac{2\pi(i*-2)}{\lambda}d\sin\bar{\theta}_2} + n_{i*}(k)$$
$$x_{i*+1}(k) =$$
$$s_1(k)e^{j\frac{2\pi(i*-0)}{\lambda}d\sin\bar{\theta}_1} + s_2(k)e^{j\frac{2\pi(i*-0)}{\lambda}d\sin\bar{\theta}_2} + n_{i*-1}(k)$$

Consequently, when two signal sources are quite close to each other, a relation according to Equation 13 is established.

$$\frac{x_i(k)}{x_{i-1}(k)} = e^{j\frac{2\pi}{\lambda}d\sin\bar{\theta}_0} (i = 2, 3, \ldots, N) \quad \text{[Equation 13]}$$

By Equation 13, Equation 11 is suitable for interpolating a received signal, and $X_{i*}$ is consequently converted into $\hat{X}_{i*}$.

After the received signal of the bad-conditioned antenna element is compensated for as described above, as illustrated in FIG. 3, Step 4-2 (S420), in which the incidence angle of the reflected wave incident on the plurality of reception antenna elements 120 is re-estimated using an angle estimation algorithm by reflecting the compensated received signal of the bad-conditioned antenna element thereon, is performed. Hereinafter, an example in which the MUSIC algorithm is applied, as in Step 2 (S200), to re-estimate the incidence angle of the reflected wave when Step 4-2 (S420) is performed will be described.

First, the signal vector $\hat{X}_{i*}$ newly generated in Step 4-1 (S410) is used to generate a new correlation matrix $\hat{R}_{xx}$ expressed as Equation 14 below.

$$\hat{R}_{xx} = \frac{1}{K} \begin{bmatrix} X_1 \\ X_2 \\ \vdots \\ \hat{X}_{i*} \\ \vdots \\ X_N \end{bmatrix} \times \begin{bmatrix} X_1 \\ X_2 \\ \vdots \\ \hat{X}_{i*} \\ \vdots \\ X_N \end{bmatrix}^H \quad \text{[Equation 14]}$$

By using the newly generated correlation matrix $\hat{R}_{xx}$ to apply the MUSIC algorithm, eigenvalue decomposition is processed. Then, new DOAs are estimated using a pseudospectrum of the MUSIC algorithm in Equation 5. Meanwhile, when the selected $i^{*th}$ element is the first or last element of an array, one adjacent received signal vector is preferably used.

Hereinafter, a spatial interpolation apparatus for a linear phased array antenna according to an embodiment of the present disclosure will be described with reference to FIG.

4 while a detailed description of content overlapping the above description of the spatial interpolation method for a linear phased array antenna according to an embodiment of the present disclosure will be omitted.

Figure 4:
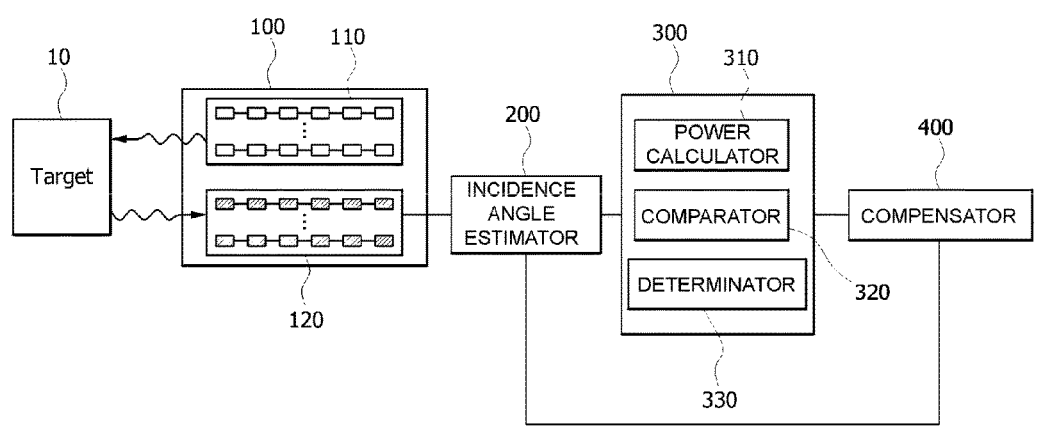
FIG. 4 is a block diagram briefly illustrating a spatial interpolation apparatus for a linear phased array antenna according to an embodiment of the present disclosure.

As illustrated in FIG. 4, the spatial interpolation apparatus for a linear phased array antenna according to an embodiment of the present disclosure includes the plurality of reception antenna elements 120, an incidence angle estimator 200, a detector 300, and a compensator 400.

The plurality of reception antenna elements 120 are configurations that are disposed together with the plurality of transmission antenna elements 110 in the linear phased array antenna 100, and perform a function of receiving a reflected wave resulting from a signal transmitted from the plurality of transmission antenna elements 110 being reflected by the target 10.

The incidence angle estimator 200 is a configuration that estimates an incidence angle of a reflected wave incident on the reception antenna elements 120, and performs a function of estimating the incidence angle of the reflected wave incident on the reception antenna elements 120 by using an angle estimation algorithm. The MUSIC algorithm may be used as the angle estimation algorithm.

The detector 300 is a configuration that performs a function of selecting a bad-conditioned antenna element among the plurality of reception antenna elements 120 based on the incidence angle of the reflected wave estimated by the incidence angle estimator 200. Specifically, the detector 300 may select a bad-conditioned antenna element based on a received signal power of a reflected wave received by each of the plurality of reception antenna elements 120. To perform this function, the detector 300 may also be configured with a power calculator 310, a comparator 320, and a determinator 330. The power calculator 310 calculates a received signal power of a reflected wave received by each of the plurality of reception antenna elements 120, the comparator 320 compares the calculated received signal power with a threshold value, and the determinator 330 determines a bad-conditioned antenna element among the plurality of reception antenna elements 120 based on a result of the comparison by the comparator 320.

The compensator 400 compensates for a received signal of the selected bad-conditioned antenna element, and a detailed description thereof will be omitted since it has been given in the description of the spatial interpolation method for a linear phased array antenna according to an embodiment of the present disclosure.

Meanwhile, in the spatial interpolation apparatus for a linear phased array antenna according to an embodiment of the present disclosure, the incidence angle estimator 200 re-estimates the incidence angle of the reflected wave incident on the reception antenna elements 120 by reflecting a received signal of the bad-conditioned antenna element compensated for by the compensator 400 thereon. As described above, a high-resolution angle estimation algorithm such as the MUSIC algorithm may be applied to estimate the incidence angle of the reflected wave.

Consequently, as the incidence angle estimator 200 firstly estimates the incidence angle of the reflected wave, the detector 300 uses the estimated incidence angle to select a bad-conditioned antenna element, the compensator 400 compensates for a received signal of the bad-conditioned antenna element, and the incidence angle estimator 200 secondly estimates the incidence angle of the reflected wave by reflecting the compensated received signal of the bad-conditioned antenna element thereon, an incidence angle of incident signals may be calculated with fine and high resolution.

According to an embodiment of the present disclosure, a spatial interpolation method and apparatus for a linear phased array antenna estimate an incidence angle of a reflected wave by using an angle estimation algorithm, select an antenna element in a bad condition when the incidence angle of the reflected wave is being estimated, and interpolate a received signal of the selected antenna element to re-estimate the incidence angle of the reflected wave, thereby improving resolution performance of a DOA estimation algorithm.

Advantageous effects of the present disclosure are not limited to those mentioned above, and other unmentioned advantageous effects should be clearly understood by those of ordinary skill in the art from the description above.

The embodiments described herein and the accompanying drawings merely illustratively describe a part of the technical spirit that belongs to the present disclosure. Consequently, since the embodiments disclosed herein are for describing the technical spirit of the present disclosure instead of limiting the same, it should be self-evident that the scope of the technical spirit of the present disclosure is not limited by the embodiments. Modified examples and specific embodiments that may be easily inferred by those of ordinary skill in the art within the scope of the technical spirit included in the specification and the drawings of the present disclosure should all be construed as belonging to the scope of the present disclosure.

DESCRIPTION OF REFERENCE NUMERALS

10: Target
100: Linear phased array antenna
110: Transmission antenna element
120: Reception antenna element
200: Incidence angle estimator
300: Detector
310: Power calculator
320: Comparator
330: Determinator
400: Compensator

What is claimed is:

1. A spatial interpolation method for a linear phased array antenna (100) including a plurality of transmission antenna elements (110) and a plurality of reception antenna elements (120), the spatial interpolation method comprising:
receiving a reflected wave reflected from a target (10) by the plurality of reception antenna elements (120) (S100);
estimating an incidence angle of the reflected wave incident on the plurality of reception antenna elements (120) (S200);
selecting a bad-conditioned antenna element from among the plurality of reception antenna elements (120) by using a received signal power of the reflected wave received by each of the plurality of reception antenna elements (120) (S300); and
compensating for a received signal of the bad-conditioned antenna element by using a received signal of another reception antenna element, and re-estimating the incidence angle of the reflected wave incident on the plurality of reception antenna elements (120) by reflecting the compensated received signal of the bad-conditioned antenna element thereon (S400).

2. The spatial interpolation method of claim 1, wherein, in the selecting of the bad-conditioned antenna element (S300), an average of received signal powers of reflected waves received by the plurality of reception antenna elements (120) is compared with a threshold value, and a reception antenna element in which the average of the received signal powers of the reflected waves is smaller than the threshold value is selected as the bad-conditioned antenna element.

3. The spatial interpolation method of claim 1, wherein, in the selecting of the bad-conditioned antenna element (S300), peak values of received signal powers of reflected waves received by the plurality of reception antenna elements (120) are compared with each other, and a reception antenna element having a smallest peak value of the received signal power is selected as the bad-conditioned antenna element.

4. The spatial interpolation method of claim 1, wherein, in the selecting of the bad-conditioned antenna element (S300), differences between floor levels of peripheral values around a peak value of the received signal power received by the plurality of reception antenna elements (120) and the peak value are compared with each other, and an antenna element with a smallest difference is selected as the bad-conditioned antenna element.

5. The spatial interpolation method of claim 1, wherein, in the selecting of the bad-conditioned antenna element (S300), a predetermined reference value is preset, and an antenna element in which a difference between floor levels of peripheral values around a peak value of the received signal power received by the plurality of reception antenna elements (120) and the peak value is the reference value or less is selected as the bad-conditioned antenna element.

6. The spatial interpolation method of claim 1, wherein, in the re-estimating of the incidence angle of the reflected wave (S400), the received signal of the bad-conditioned antenna element is compensated for by using a received signal of a reception antenna element adjacent to the bad-conditioned antenna element.

7. The spatial interpolation method of claim 1, wherein, in the estimating of the incidence angle of the reflected wave (S200) and the re-estimating of the incidence angle of the reflected wave (S400), an angle estimation algorithm is used.

8. The spatial interpolation method of claim 7, wherein the angle estimation algorithm is a multiple signal classification (MUSIC) algorithm or an estimation of parameters via rotational invariance technique (ESPRIT).

9. A spatial interpolation apparatus for a linear phased array antenna, the spatial interpolation apparatus comprising:
a plurality of reception antenna elements (120) configured to receive a reflected wave reflected from a target (10);
an incidence angle estimator (200) configured to estimate an incidence angle of the reflected wave incident on the plurality of reception antenna elements (120);
a detector (300) configured to select a bad-conditioned antenna element among the plurality of reception antenna elements (120) by using a received signal power of the reflected wave received by each of the plurality of reception antenna elements (120); and
a compensator (400) configured to compensate for a received signal of the bad-conditioned antenna element using a received signal of another reception antenna element,
wherein the incidence angle estimator (200) re-estimates the incidence angle of the reflected wave incident on the plurality of reception antenna elements (120) by reflecting the compensated received signal of the bad-conditioned antenna element.

10. The spatial interpolation apparatus of claim 9, wherein the detector (300) compares an average of received signal powers of reflected waves received by the plurality of reception antenna elements (120) with a threshold value and selects a reception antenna element in which the average of the received signal powers of the reflected waves is smaller than the threshold value as the bad-conditioned antenna element.

11. The spatial interpolation apparatus of claim 9, wherein the detector (300) compares peak values of received signal powers of reflected waves received by the plurality of reception antenna elements (120) with each other and selects a reception antenna element having a smallest peak value of the received signal power as the bad-conditioned antenna element.

12. The spatial interpolation apparatus of claim 9, wherein the detector (300) compares differences between floor levels of peripheral values around a peak value of the received signal power received by the plurality of reception antenna elements (120) and the peak value with each other and selects an antenna element with a smallest difference as the bad-conditioned antenna element.

13. The spatial interpolation apparatus of claim 9, wherein the detector (300) presets a predetermined reference value and selects an antenna element in which a difference between floor levels of peripheral values around a peak value of the received signal power received by the plurality of reception antenna elements (120) and the peak value is the reference value or less as the bad-conditioned antenna element.

14. The spatial interpolation apparatus of claim 9, wherein the compensator (400) compensates for the received signal of the bad-conditioned antenna element by using a received signal of a reception antenna element adjacent to the bad-conditioned antenna element.

15. The spatial interpolation apparatus of claim 9, wherein the incidence angle estimator (200) estimates or re-estimates the incidence angle of the reflected wave incident on the plurality of reception antenna elements (120) by using an angle estimation algorithm.

16. The spatial interpolation apparatus of claim 15, wherein the angle estimation algorithm is a multiple signal classification (MUSIC) algorithm or an estimation of parameters via rotational invariance technique (ESPRIT).

* * * * *